UNITED STATES PATENT OFFICE.

FRITZ BENDER, OF MÜHLHEIM, HESSEN, GERMANY, ASSIGNOR TO A. LEONHARDT & CO., OF SAME PLACE.

PRODUCTION OF YELLOW COLORING-MATTER.

SPECIFICATION forming part of Letters Patent No. 344,075, dated June 22, 1886.

Application filed February 16, 1886. Serial No. 192,096. (Specimens.)

*To all whom it may concern:*

Be it known that I, FRITZ BENDER, doctor of philosophy, a citizen of Germany, and resident at Mühlheim, in the Grand Duchy of Hessen, have invented new and useful Improvements in Coloring-Matter, of which the following is a specification.

The new coloring-matter is a carbon acid, and is obtained by diazotating nitroaminbenzoic acid and combining the product thereof with metaphenylendiamine.

The method of manufacture is as follows, viz: 20.4 kilograms of the sodium salt of the symmetric nitroamidobenzoic acid, (as obtained by reducing common dinitrobenzoic acid,) are diazotated and the product added to a solution of eighteen kilograms of hydrochlorate of metaphenylendiamine. The coloring-matter is obtained at once. It is converted into the easily-soluble sodium salt and this precipitated from the solution by common salt.

This coloring-matter is a brownish powder easily soluble in hot water. It forms salts with acids and with bases, but only the salts formed by acids can be fixed on the fiber. The hydrochlorate is scarcely soluble in cold water—more easily, however, in hot water. The hot hydrochloric solution is not precipitated by alkalies. In this point it differs from the solution of the coloring-matter which is the subject of my application for patent of the United States, Serial No. 179,041, filed October 5, 1885. If the solution of the sodium salt is treated with acetic acid, or if the solution of the hydrochlorate is treated with acetate of sodium, a hardly soluble precipitate is formed. The hydrochloric solution of this coloring-matter can be discolored by acid-reducing agents—as, for instance, by zinc-powder and hydrochloric acid. If the filtrate is treated by chloride of iron, a red color is formed, which, however, is not a permanent one.

I claim—

1. The herein-described process of making a yellow coloring-matter by combining diazotated nitroamidobenzoic acid with metaphenylendiamine, converting the same into a sodium salt and crystallizing it out of the solution.

2. The yellow coloring-matter produced by the process hereinabove described and having the qualities hereinabove set forth.

In testimony whereof I have signed my name to this specification in the presence of two subscribing witnesses.

FRITZ BENDER.

Witnesses:
 FRANZ HASSLACHER,
 JOSEPH PATRICK.